Oct. 6, 1936. C. W. CURLE ET AL 2,056,566
METHOD AND APPARATUS FOR TRIMMING SLUGS
Filed Dec. 21, 1935 8 Sheets-Sheet 1

INVENTORS
CHARLES W. CURLE
THEODORE C. CURLE
BY
ATTORNEY.

Oct. 6, 1936.   C. W. CURLE ET AL   2,056,566
METHOD AND APPARATUS FOR TRIMMING SLUGS
Filed Dec. 21, 1935   8 Sheets-Sheet 2

INVENTORS
CHARLES W. CURLE.
THEODORE C. CURLE.
BY
ATTORNEY.

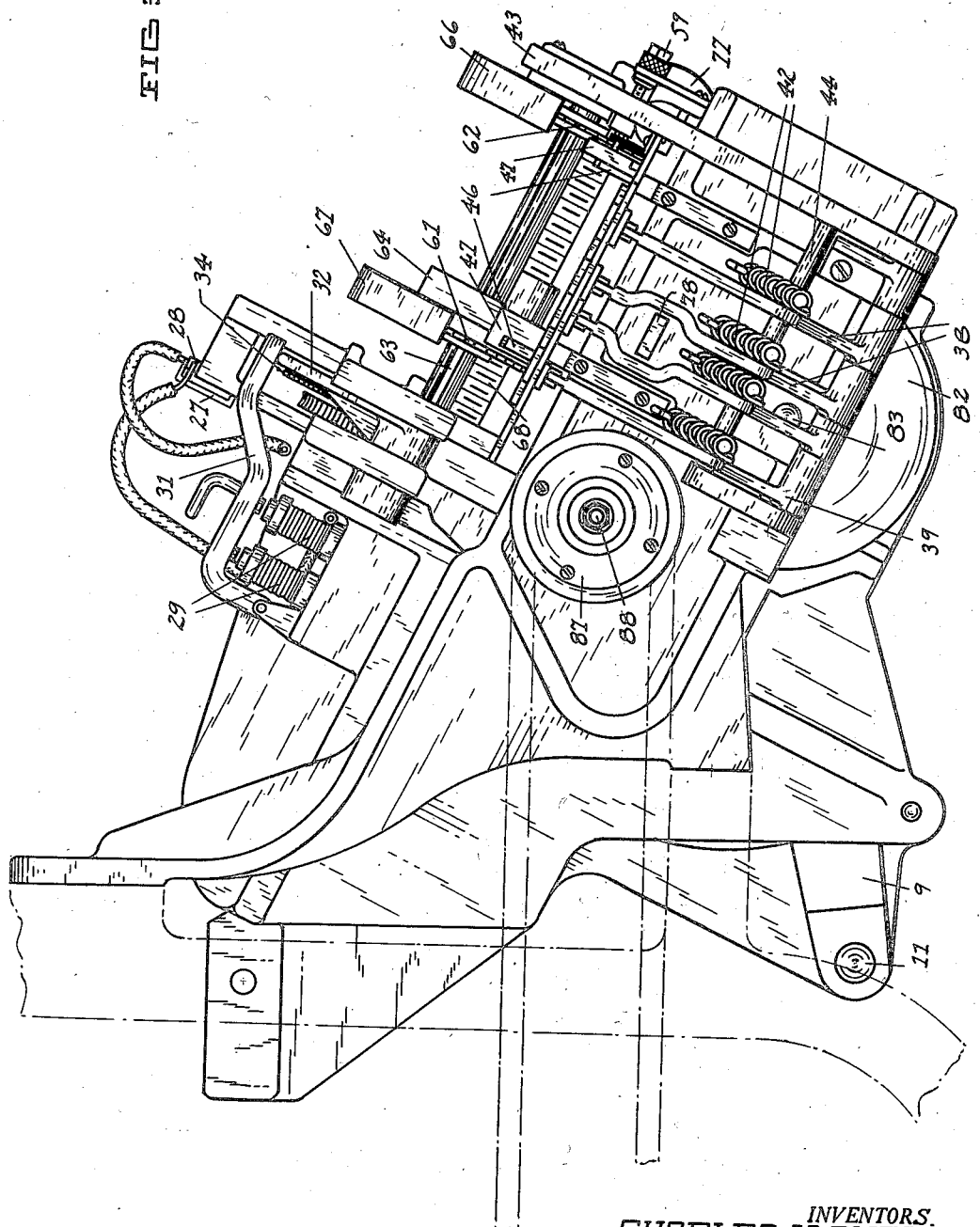

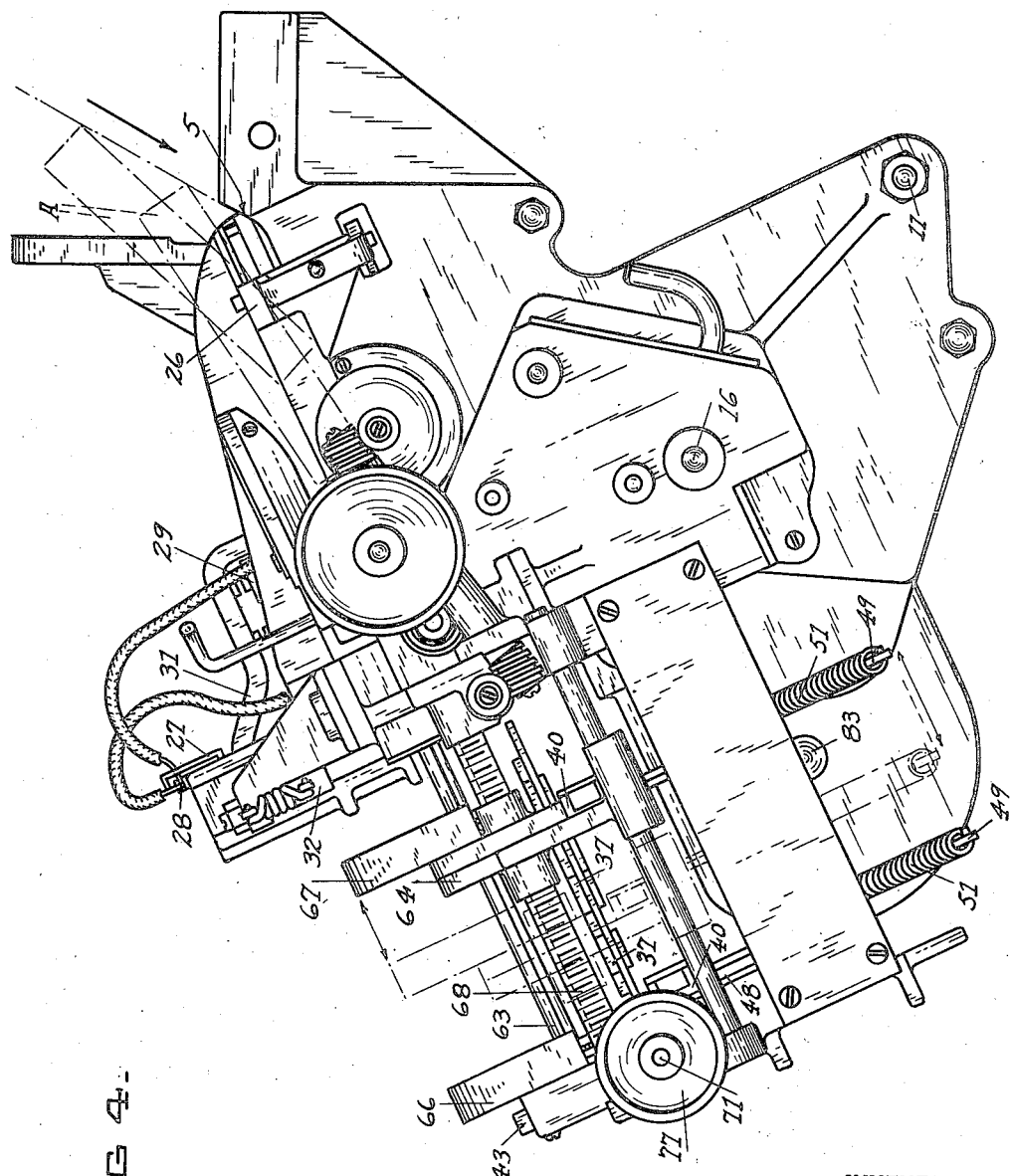

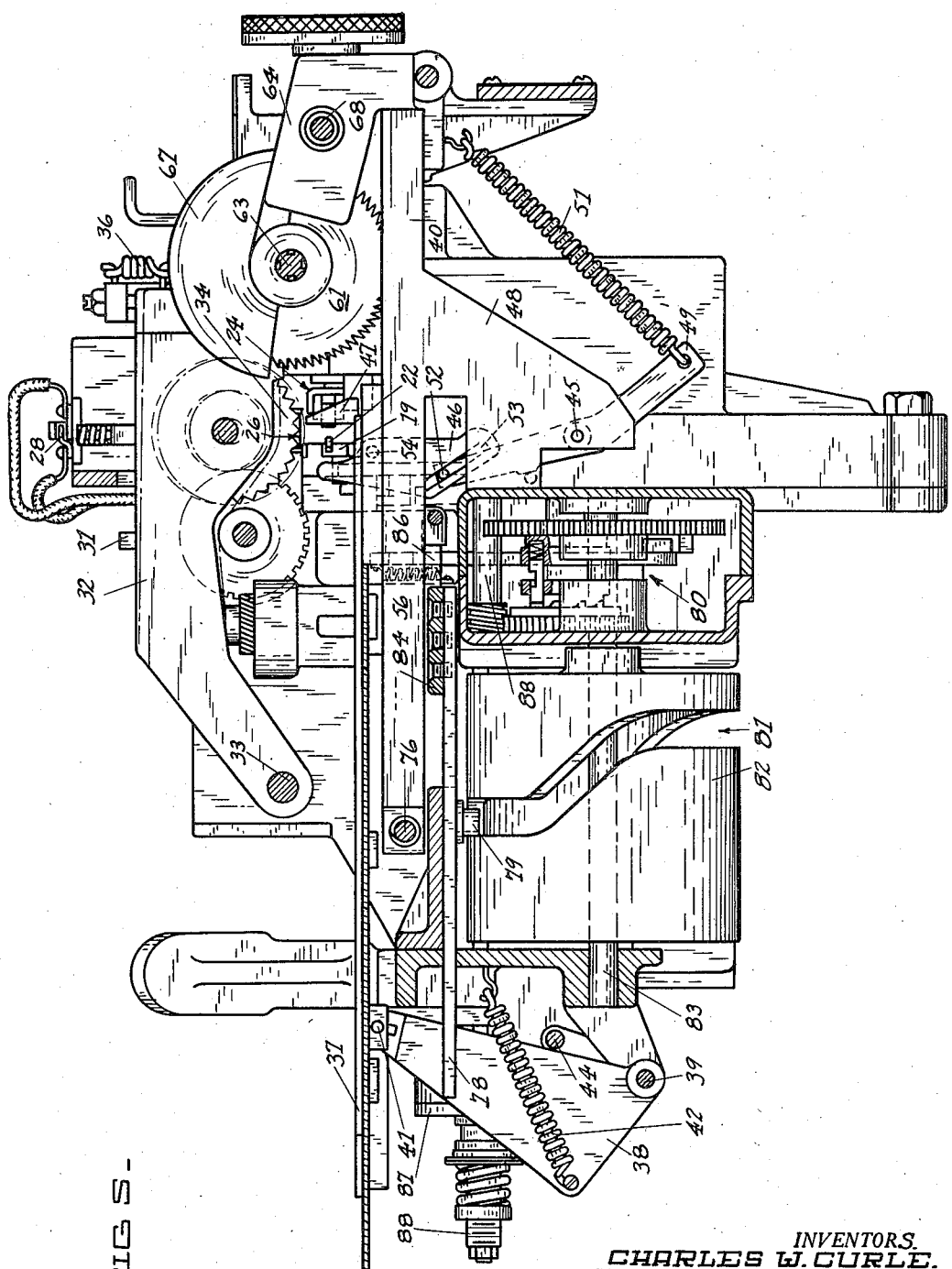

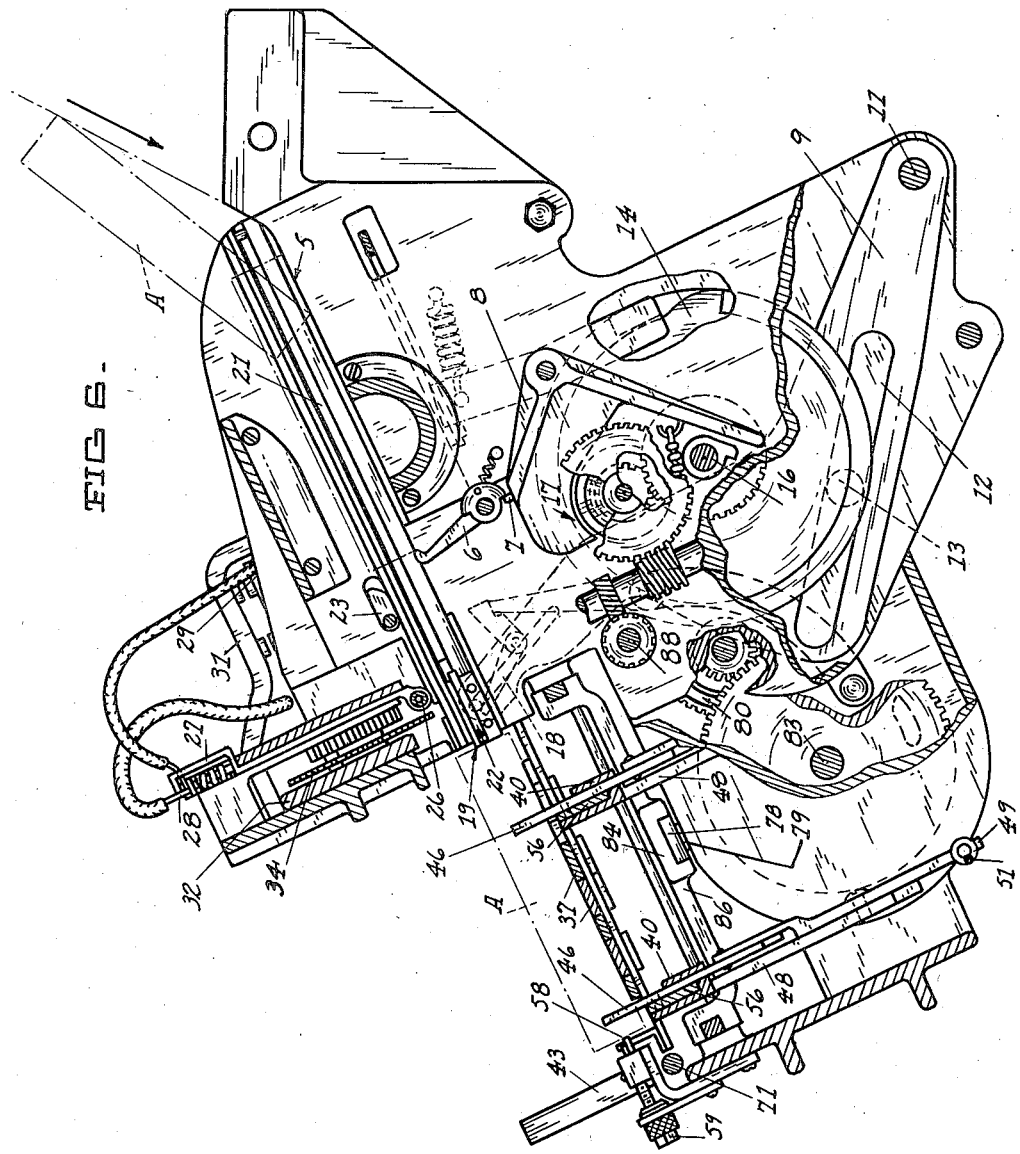

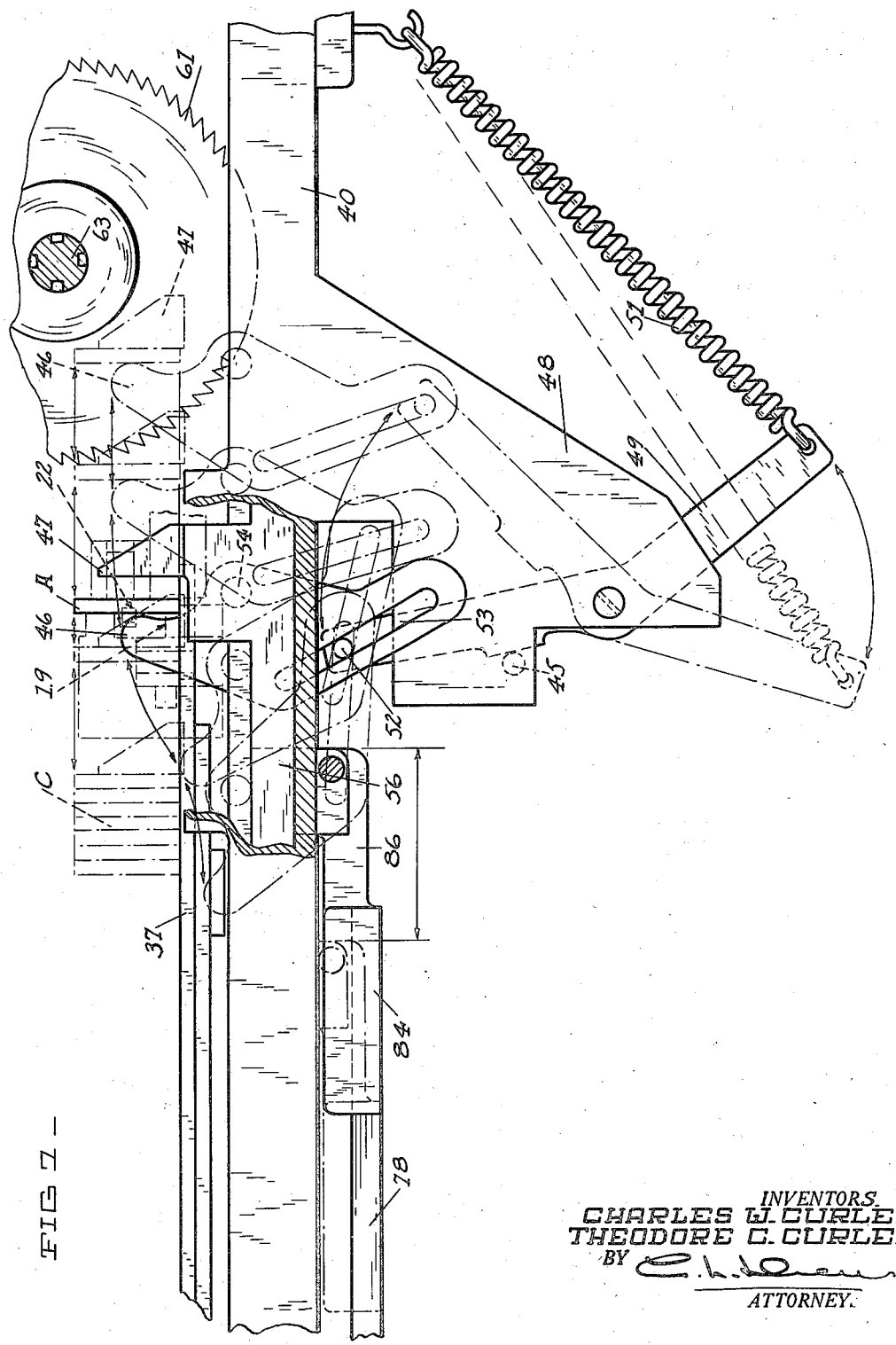

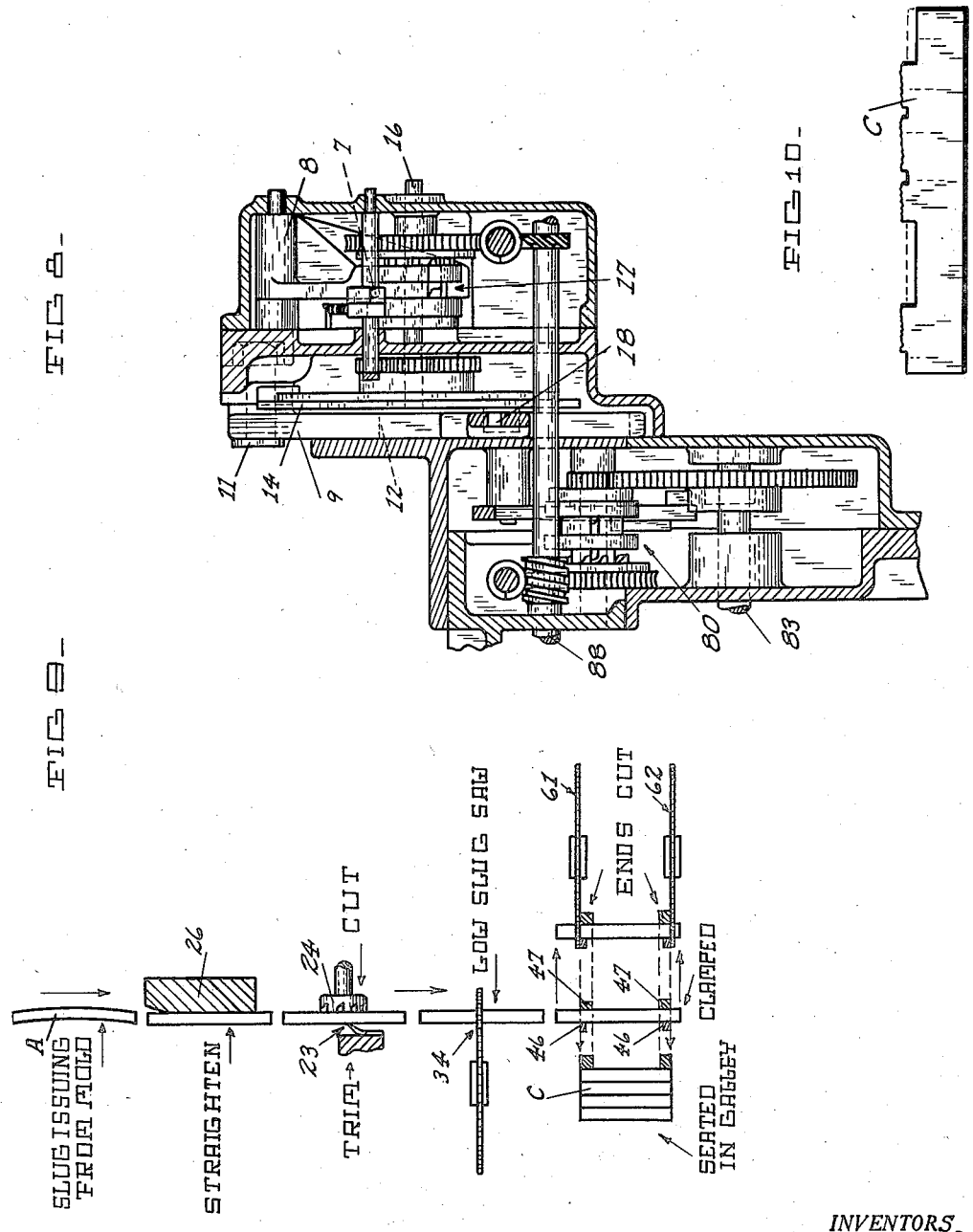

Patented Oct. 6, 1936

2,056,566

UNITED STATES PATENT OFFICE 2,056,566

METHOD AND APPARATUS FOR TRIMMING SLUGS

Charles W. Curle and Theodore C. Curle, San Francisco, Calif.

Application December 21, 1935, Serial No. 55,630

13 Claims. (Cl. 199—59)

This invention relates to improvements in line of type casting machines, and has particular reference to a method and apparatus for treatment of slugs issuing therefrom.

The principal object of this invention is to provide means for automatically trimming a line of type so that it is accurate as to thickness from end to end and top to bottom; accurate as to length, and with the ends square and parallel to each other; further, to provide means for cutting away metal between the words so as to prevent any offset in printing from the slug.

A further object is to produce a device of this character which may be attached to the line of type casting machine without altering its construction and in such a manner that the slug will be delivered directly into the attachment.

A further object is to provide means whereby the device may be accurately adjusted to accommodate for various sizes of slugs both as to point measurement and em measurement.

A further object is to produce a machine of this character which will stack the finished slugs after the trimming operation.

Other objects and advantages will be apparent during the course of the following description.

In the accompanying drawings forming a part of this specification and in which like numerals are employed to designate like parts throughout the same, Fig. 1 is a top plan view of our attachment;

Fig. 3 is an end view looking from the left of Fig. 1;

Fig. 4 is an end view looking from the right of Fig. 1;

Fig. 5 is a cross sectional view taken on the line 5—5 of Fig. 1;

Fig. 6 is a cross sectional view taken on the line 6—6 of Fig. 1;

Fig. 7 is an enlarged fragmentary detail view showing the operation of the slug grippers;

Fig. 8 is a horizontal cross sectional view of the driving gears and clutches;

Fig. 9 is a diagrammatic view illustrating the various steps taken by the slug in passing through the machine; and Fig. 10 is a side elevation of a slug showing the manner in which it has been low slugged.

Slugs cast by a line casting machine will vary several thousandths of an inch in thickness from top to bottom, also in length from top to bottom due to the fact that the mold is built with a draw or taper so that the slug may be readily pushed therefrom. It therefore becomes necessary to trim each individual slug so that the sides and ends will be parallel and of the same thickness at all corresponding points. This trimming has heretofore been accomplished by taking the slugs and individually treating each slug; that is, sawing the slug as to length, passing it through parallel knives to produce the correct thickness and routing between individual words where there is any considerable space in order to lower the surface of the blank metal and thus prevent an offset. It must, therefore, be apparent that this trimming consumes considerable time. After a number of slugs have been trimmed they are assembled and locked in a printing frame, and were it not for this trimming, the act of locking would cause the metal slugs to buckle upwardly either before or during the printing operation. Applicants have, therefore, devised a method of trimming these slugs automatically to maintain all of the slugs to an exact measurement, thus obviating the difficulties above referred to.

In order to simplify the description, each unit of operation will be described separately, all of which units operate in proper sequence to form a completed operation.

Figure 1:
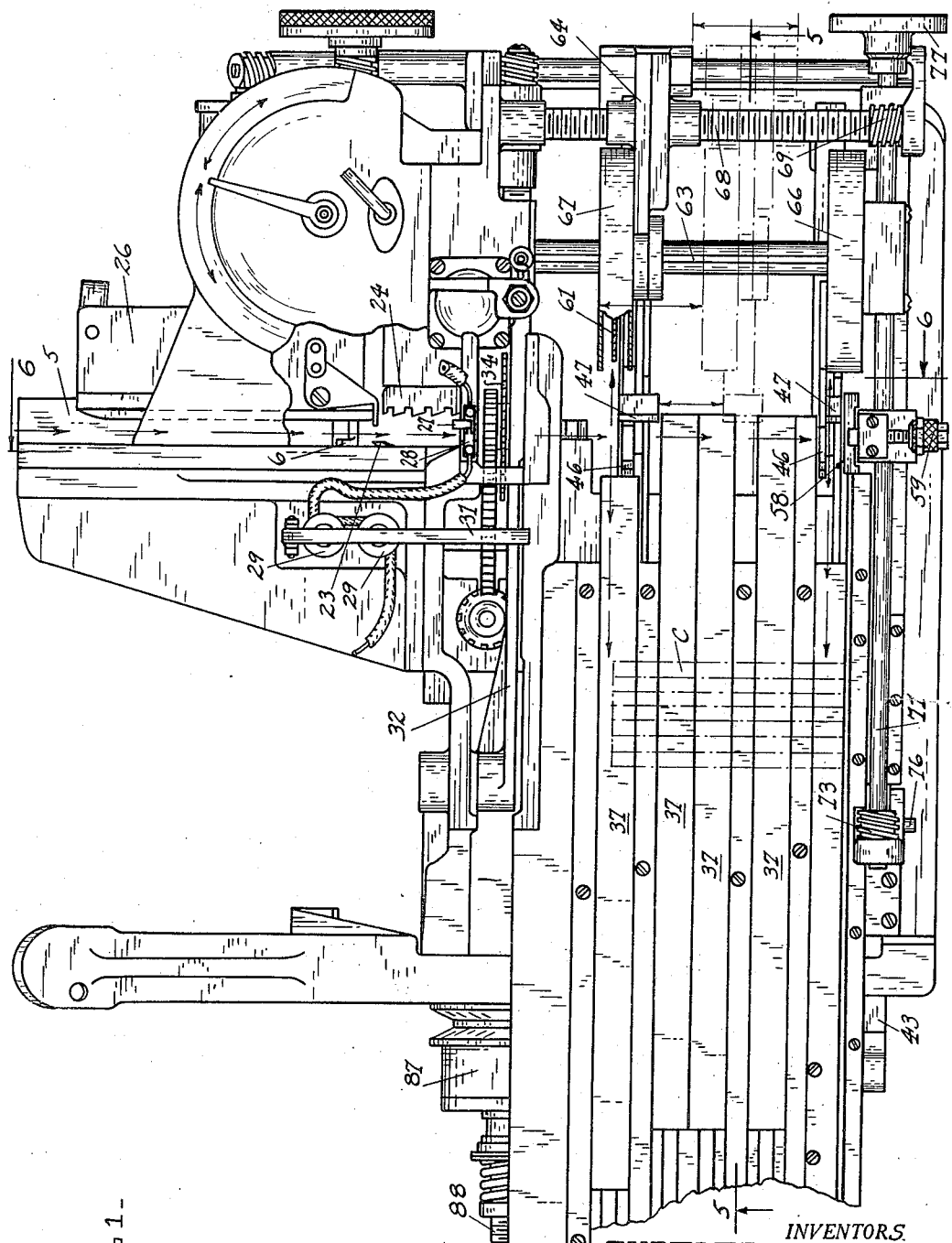

The first operation consists in receiving the slug from the line of type casting machine, which slug enters our machine as indicated by the top arrow in Fig. 1 or the arrow of Figs. 4 and 6, the slug being indicated at A in broken lines in Figs. 4 and 6. This slug enters a channel 5, and as the slug slides down the channel (which is inclined) the end of the slug will engage a trip 6 which releases a pin 7 attached to a pivoted clutch bracket 8, which clutch bracket sets into motion the slug feeding mechanism consisting essentially of an arm 9 pivoted as at 11 and having a slot 12 in which a roller 13 moves, this roller being mounted upon the side of the cam disc 14, which disc is in turn mounted upon the shaft 16. This shaft is in turn driven through the clutch mechanism designated as a whole by the numeral 17. As a result of the tripping action the arm 9 will travel from substantially a vertical position, not shown, to the position of Fig. 6. This arm 9 has a slot 18 which slidably engages the slug feeder 19 which travels in a slot 21 formed in the side of the channel 5. This slug feeder is provided with a retractable finger 22, which finger engages the upper end of the slug and pushes the slug downwardly through the channel 5. During the course of the slug movement one side thereof will be engaged by a stationary knife 23 while the opposite side of the slug is engaged by a rotary cutter 24. This rotary cutter and clamping mechanism 26 has already been described in Patent No. 2,011,212. Therefore, as the slug travels through the channel, both sides will be trimmed so as to produce an equal thickness from end to end and from top to bottom.

The second operation on the slug now occurs, and as the slug approaches the lower end of the channel 5 it engages a roller 26 which rolls upon the face of the slug, or in other words, upon the type formed upon the slug. As soon as the slug engages the roller, the roller is elevated, pushing upwardly upon a rod 27 which breaks an electrical circuit in a switch 28 (see Figs. 2 and 5), the purpose of which will later be seen. This roller 26 is of sufficient diameter to bridge small spaces between words.

Referring now to Fig. 5, it will be noted that the arm 32, pivoted at 33, carries a cutter 34, which cutter overlies the lower end of the channel 5 and is continuously driven through suitable gearing mechanism. This arm 32 is normally held in the position of Fig. 5 by a spring 36 and it is only when the circuit is established through the switch 28 that the position of the arm changes. When the switch 28 is closed the solenoids 29 pull upon an armature 31, which armature engages the top of the arm 32 and causes the same to be depressed. This depression occurs only at the time that the cutter is above a gap in the line of type on the slug and produces a result best illustrated in Fig. 10 where it will be noted a part of the slug has been cut away. As the slug emerges from the channel 5 it is delivered onto a supporting surface which includes a plurality of sliding bars 37. As the action of all of these bars is alike, but one will be described.

Figure 2:
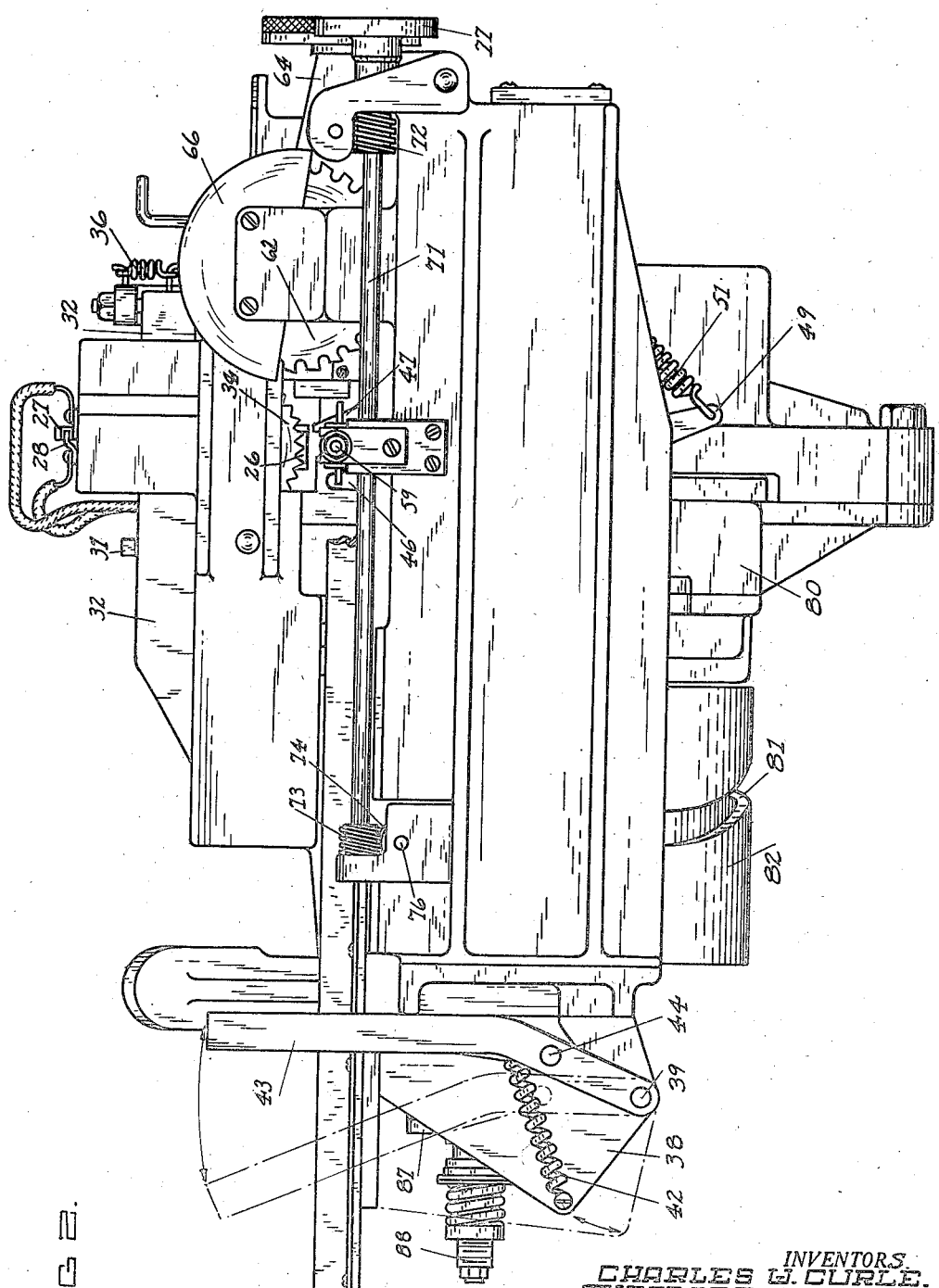
Fig. 2 is a front view of Fig. 1.

It is here noted that the third operation starts, that of gripping the slug and delivering it to the end cutting saws. Referring now to Figs. 2 and 5, it will be seen that a quadrant 38 is pivoted as at 39 and has sliding pivotal engagement as at 41 with the bar 37. A spring 42 normally holds the bar in its right hand position and in order to move these bars toward the left of the drawing, a hand lever 43, also pivoted at 39, has a rod 44 extending behind the quadrant of each of the bars. The reason for having these bars movable is that they must be capable of supporting the slug and also capable of being retracted when one of the grippers chances to be in alignment therewith, as will be later described. The grippers are so formed and adjusted that the jaws are in open position at the time the slug is delivered onto the bars 37. This gripper consists of a pair of jaws 46 and 47 (see Fig. 7). These jaws are mounted upon a plate 48 having a channel extension 40 (and it will be here mentioned that there are two grippers so as to clamp both ends of the slug at a point adjacent the cutting). The action of the gripper is such that it will clamp a slug of various thicknesses tightly and will later release the slug and one of the jaws will disappear during the stacking operation. This is accomplished by employing a pivoted lever 49 which is normally held by a spring 51 in the full line position of Fig. 7. A stop 45 limits the movement of the lever in one direction. This lever 49 carries a pin 52 at its upper end, which engages a slot 53 formed in the lower end of the jaw 46, which jaw is pivoted as at 54 in a reciprocated member 56, which member has the jaw 47 formed integral therewith.

The result of this construction is that when the member 56 is moved toward the right of the drawing the jaw 46 will start to move from the left hand dotted position due to its engagement with the pin 52 and the fact that the pivot point 54 is moving toward the right. As the jaw 46 engages the slug A, the same will be pushed against the jaw 47 which will stop further movement between the two jaws, but further movement of the pivot 54 toward the right will exert pressure upon the pin 52 causing the lever 49 to rotate about its pivot against the tension of the spring 51. As the slide 56 continues toward the right of the drawing the end of the slug will be engaged by rotary saws 61 and 62, where the ends of the slug will be trimmed parallel and to a definite length.

The upper set of jaws in Figs. 1 and 4 constituting one of the grippers is movable to or away from the lower gripper, as shown in dot and dash lines. The lower gripper remaining stationary with respect to the supporting bars and its adjacent saw, while the upper gripper moves with respect to the supporting bars and simultaneous with its adjacent saw.

The fourth operation occurs at this place, namely, the sawing of the slugs to proper length and to also square the ends. This is accomplished by the movement of the grippers toward the right of the drawing carrying the slug which has come to rest therein and with its end against the stop 58, which stop is adjustable through the medium of a knurled headed screw 59. As the grippers move toward the left, the ends of the slug will come into contact with the saws 61 and 62 (see Figs. 1 and 3). These saws are mounted upon a shaft 63 which is rotated through suitable gearing. The saw 61 is splined to the shaft 63 and is movable thereon through the medium of a bracket 64. Covers for the saws are shown at 66 and 67. The bracket 64 is mounted upon a threaded element 68 which is rotated through a worm 69, which worm is driven from a shaft 71 and suitable gear 72. A worm gear 73 mounted upon the shaft 71 meshes with a worm 74 mounted upon the threaded shaft 76 having threaded engagement with the channel 40 of the upper gripper of Figs. 4 and 7. A hand wheel 77 when rotated in one direction will rotate the threaded shafts 68 and 76 so as to cause the saw 61 and the gripper to move toward or away from the saw 62 and its gripper, and due to the simultaneous rotation of the two threaded shafts the movement of the grippers and saws will be parallel. It is at this time of adjusting that it is sometimes necessary to slide the bars 37 toward the left of Fig. 1 which is accomplished through the medium of the hand lever 43, as before mentioned. By viewing Fig. 1 it will be apparent that the upper grippers 46 and 47 could not be moved toward the lower gripper without retracting the bars 37, and should the length of the slug be such that the upper gripper will come to rest in alignment with one of the bars, that particular bar will be held back as illustrated in this figure. Should the upper gripper be moved further toward the lower gripper, it might be possible that the same would come to stop in alignment with one of the center bars 37, which bar would then be held back by the gripper while the upper bar 37 would assume its normal position and support the upper end of the slug. The manner of moving the grippers together with their slug against the saw blades and back to stacking position is accomplished through the medium of a pusher rod 78 having a roller 79 which engages a cam groove 81 formed in the barrel casting 82. This casting is rotated by a shaft 83 driven by the clutch mechanism 80. This pusher bar 78 is connected to the extensions 56 through the medium of a cross head 84 and link arrangement 86. On the backward movement or movement toward the left of Figs. 1 and 5 the slug is withdrawn from engagement with the saws and moved onto the bars 37 by the jaws 47, the jaws 46 disappearing beneath the level of the bars 37 as shown in the right hand dotted position of Fig. 7, the stacked slugs being shown in broken lines at C in this figure.

The entire mechanism is driven through a friction clutch 87 mounted upon the drive shaft 88 (see Fig. 8), the purpose of the friction clutch being to permit slippage in case any part of the mechanism might become clogged. The shaft 88 drives the clutch mechanisms, before referred to by the numeral 17 and 80, which operate the arm 9 and the other operating the barrel cam 82.

The manner in which these clutches are timed and operate is immaterial to this application and is merely illustrated as one possible means of accomplishing the desired timing and drive. Referring to Fig. 9 we have diagrammatically illustrated at the top of the view an exaggerated curved slug issuing from a line of type casting machine and next the act of straightening the slug through the squeezing action between the sides of the channel as illustrated in the patent referred to in the first part of this specification.

The next operation is shown in this figure as the trim cut, one side being trimmed by the knife 23 while the opposite side is cut by a rotary cutter 24. As the slug now moves downwardly it passes beneath the low slugging saw 34, which saw will move downwardly and remove any excessive metal in the spaces between type faces. From this point the slug moves downwardly between the gripper jaws 46 and 47 where it is engaged and then moved toward the saws 61 and 62, and after the ends have been cut the slug will be returned toward the left of this figure, the jaws 46 disappearing beneath the supporting surface (bars 37) and the jaws 47 will move the trimmed slug against the stack of previously trimmed slugs.

It will be apparent from the above description that with our machine it is possible to automatically surface the sides and ends and low slug a slug, thus producing cast lines of type which may be locked into a printing frame without further work thereon and lines of type which will lock up evenly and, therefore, will not tend to buckle or come loose during the printing operation.

It is to be understood that the form of our invention herewith shown and described is to be taken as a preferred example of the same and that various changes relative to the material, size, shape, and arrangement of parts may be resorted to without departing from the spirit of the invention or the scope of the subjoined claims.

Having thus described our invention, we claim:—

1. The method of treating slugs issuing from a line of type casting machine to obtain accuracy as to thickness and length which consists in first feeding a slug lengthwise to surface the sides thereof, thereafter moving the slug sidewise in one direction to simultaneously sever one end thereof and to trim the other end thereof, and finally moving the slug sidewise in the opposite direction to stack the same.

2. The method of treating slugs issuing from a line of type casting machine to obtain accuracy as to thickness and length which consists in first feeding a slug lengthwise to surface the sides thereof, thereafter low slugging the slug during its continued endwise movement, thereafter moving the slug sidewise in one direction to simultaneously sever the ends thereof, and finally moving the slug sidewise in the opposite direction to stack the same.

3. In a device of the class described, in combination with a line of type casting machine, of slug trimming mechanism thereof, inclined means for receiving the slug in endwise relation from said casting machine, means for moving said slug through said mechanism, means for trimming the opposite sides of said slug during its movement through said mechanism, means for simultaneously trimming the ends of said slug.

4. In a device of the class described, in combination with a line of type casting machine, of slug trimming mechanism thereof, inclined means for receiving the slug in endwise relation from said casting machine, means for moving said slug through said mechanism, means for trimming the opposite sides of said slug during its movement through said mechanism, means for simultaneously trimming the ends of said slug, and means for stacking said slugs at the completion of the trimming operation.

5. In a device of the class described, in combination with a line of type casting machine, of slug trimming mechanism thereof, inclined means for receiving the slug in endwise relation from said casting machine, means for moving said slug through said mechanism, means for trimming the opposite sides of said slug during its movement through said mechanism, means for low slugging said slug during its movement in an endwise direction, means for simultaneously trimming the ends of said slug, and means for stacking said slugs at the completion of the trimming operation.

6. In a device of the class described, in combination with a line of type casting machine, of slug trimming mechanism therefor and adapted to receive a slug endwise from said casting machine, means for feeding said slug through said mechanism, stationary means for trimming one side of said slug, rotatable means for trimming the opposite side thereof during its endwise movement through said mechanism, means for low slugging said slug during its movement through said mechanism in an endwise direction, gripper means for engaging said slug to move said slug sidewise, and means for simultaneously trimming the ends of said slug parallel and of a predetermined length.

7. In a device of the class described, in combination with a line of type casting machine, of slug trimming mechanism therefor and adapted to receive a slug endwise from said casting machine, means for feeding said slug through said mechanism, stationary means for trimming one side of said slug, rotatable means for trimming the opposite side thereof during its endwise movement through said mechanism, means for low slugging said slug during its movement through said mechanism in an endwise direction, gripper means for engaging said slug to move said slug sidewise, and means for simultaneously trimming the ends of said slug parallel and of a predetermined length, said low slugging means comprising a movable cutter suspended above the plane of endwise movement of said slug, and means for depressing said cutter against said slug at designated points.

8. In a device of the class described, in combination with a line of type casting machine, of slug trimming mechanism therefor and adapted to receive a slug endwise from said casting machine, means for feeding said slug through said mechanism, stationary means for trimming one side of said slug, rotatable means for trimming the opposite side thereof during its endwise movement through said mechanism, means for low slugging said slug during its movement through said mechanism in an endwise direction, gripper means for engaging said slug to move said slug sidewise, and means for simultaneously trimming the ends of said slug parallel and of a predetermined length, said low slugging means comprising a movable cutter suspended above the plane of endwise movement of said slug, and means for depressing said cutter against said slug at designated points, said depressing means including a movable member riding on said slug and capable of actuating said low slugging cutter when said movable member encounters a recess in the face of said slug.

9. In a device of the class described, in combination with a line of type casting machine, of trimming mechanism cooperating therewith and adapted to receive the cast slug therefrom, said trimming mechanism embodying a channel capable of receiving said slug in an endwise direction, means for moving the slug through said channel, a stationary trimmer arranged on one side of said channel and adapted to trim one side of said slug, a movable trimmer mounted on the opposite side of said channel and adapted to trim the opposite side of said slug, a movable member capable of engaging the top of said slug during its endwise movement, a cutter arranged in the normal path of movement of said slug, means for elevating said cutter, and means associated with said movable means to depress said cutter when said movable means engages a depression formed in said slug.

10. In a device of the class described, in combination with a line of type casting machine, of trimming mechanism cooperating therewith and adapted to receive the cast slug therefrom, said trimming mechanism embodying a channel capable of receiving said slug in an endwise direction, means for moving the slug through said channel, a stationary trimmer arranged on one side of said channel and adapted to trim one side of said slug, a movable trimmer mounted on the opposite side of said channel and adapted to trim the opposite side of said slug, a movable member capable of engaging the top of said slug during its endwise movement, a cutter arranged in the normal path of movement of said slug, means for elevating said cutter, and means associated with said movable means to depress said cutter when said movable means engages a depression formed in said slug, and slug receiving means capable of gripping said slug whereby said slug may be moved sidewise.

11. In a device of the class described, in combination with a line of type casting machine, of trimming mechanism cooperating therewith and adapted to receive the cast slug therefrom, said trimming mechanism embodying a channel capable of receiving said slug in an endwise direction, means for moving the slug through said channel, a stationary trimmer arranged on one side of said channel and adapted to trim one side of said slug, a movable trimmer mounted on the opposite side of said channel and adapted to trim the opposite side of said slug, a movable member capable of engaging the top of said slug during its endwise movement, a cutter arranged in the normal path of movement of said slug, means for elevating said cutter, and means associated with said movable means to depress said cutter when said movable means engages a depression formed in said slug, and slug receiving means capable of gripping said slug whereby said slug may be moved sidewise, and a pair of cutters capable of simultaneously severing the ends of said slug when said slug is moved sidewise.

12. In a device of the class described, in combination with a line of type casting machine, of trimming mechanism cooperating therewith and adapted to receive the cast slug therefrom, said trimming mechanism embodying a channel capable of receiving said slug in an endwise direction, means for moving the slug through said channel, a stationary trimmer arranged on one side of said channel and adapted to trim one side of said slug, a movable trimmer mounted on the opposite side of said channel and adapted to trim the opposite side of said slug, a movable member capable of engaging the top of said slug during its endwise movement, a cutter arranged in the normal path of movement of said slug, means for elevating said cutter, and means associated with said movable means to depress said cutter when said movable means engages a depression formed in said slug, and slug receiving means capable of gripping said slug whereby said slug may be moved sidewise, and a pair of cutters capable of simultaneously severing the ends of said slug when said slug is moved sidewise, one of said last mentioned cutters being movable toward or away from its corresponding cutter.

13. A method of treating slugs issuing from a line of type casting machine to obtain accuracy as to thickness and length which consists in first feeding a slug lengthwise to surface the sides thereof, thereafter moving the slug sidewise in one direction to simultaneously sever one end thereof and to trim the other end thereof.

CHARLES W. CURLE.
THEODORE C. CURLE.